US012597886B2

(12) United States Patent
Kuang

(10) Patent No.: US 12,597,886 B2
(45) Date of Patent: Apr. 7, 2026

(54) CONSTANT-POWER SUPPLY APPARATUS AND SOLAR SIMULATION FACILITY

(71) Applicant: SHENZHEN SUNNY XIAO TECHNOLOGY CO., LTD., Shenzhen (CN)

(72) Inventor: Xiao Kuang, Shenzhen (CN)

(73) Assignee: SHENZHEN SUNNY XIAO TECHNOLOGY CO., LTD., Shenzhen (CN)

( * ) Notice: Subject to any disclaimer, the term of this patent is extended or adjusted under 35 U.S.C. 154(b) by 623 days.

(21) Appl. No.: 17/283,970

(22) PCT Filed: Jul. 16, 2020

(86) PCT No.: PCT/CN2020/102434
§ 371 (c)(1),
(2) Date: Feb. 22, 2023

(87) PCT Pub. No.: WO2022/011646
PCT Pub. Date: Jan. 20, 2022

(65) Prior Publication Data
US 2023/0216446 A1     Jul. 6, 2023

(51) Int. Cl.
*H02S 50/10* (2014.01)
*H02J 7/35* (2006.01)

(52) U.S. Cl.
CPC ............... *H02S 50/10* (2014.12); *H02J 7/35* (2013.01)

(58) Field of Classification Search
CPC ........... H02S 50/10; H02J 7/35; H02M 1/007; H02M 1/08; H02M 7/5387; H02M 3/156; H05B 39/045; H05B 39/041; Y02B 20/00

USPC .......................................................... 320/108
See application file for complete search history.

(56) References Cited

U.S. PATENT DOCUMENTS

| | | | | |
|---|---|---|---|---|
| 7,372,241 | B1 * | 5/2008 | Tomiyoshi .......... | H02M 3/1588 |
| | | | | 323/283 |
| 2006/0244426 | A1 * | 11/2006 | Wu ......................... | H02M 1/12 |
| | | | | 323/207 |
| 2012/0049761 | A1 * | 3/2012 | Yu ........................ | G09G 3/3406 |
| | | | | 315/294 |

FOREIGN PATENT DOCUMENTS

| | | |
|---|---|---|
| CN | 101309047 A | 11/2008 |
| CN | 105071657 A | 11/2015 |

* cited by examiner

*Primary Examiner* — Huy Q Phan

(57) ABSTRACT

Disclosed are a constant-power supply apparatus and a solar simulation facility. The constant-power supply apparatus comprises: a power board and a control panel, wherein the power board comprises: a power input circuit for providing a power input, a power conversion circuit connected to the power input circuit, a voltage detection circuit, a current detection circuit and a power output circuit respectively connected to the power conversion circuit, and a first connector connected to the power conversion circuit, the voltage detection circuit and the current detection circuit; and the control board comprises: a second connector pluggably connected to the first connector, a voltage processing circuit and a current processing circuit respectively connected to the second connector, a multiplier circuit connected to the voltage processing circuit and the current processing circuit, and a PWM circuit connected to the current processing circuit, the multiplier circuit and the second connector.

20 Claims, 3 Drawing Sheets

CONSTANT-POWER SUPPLY APPARATUS AND SOLAR SIMULATION FACILITY

BACKGROUND OF THE INVENTION

1. Technical Field

The invention relates to the technical field of driving power, and particularly to a constant-power supply apparatus and a solar simulation facility.

2. Description of Related Art

Solar simulation test facilities typically use a HQI discharge bulb of OSRAM as a light source to test ultraviolet parameters. With the long-term use of the bulb, the resistance of a circuit in the bulb will increase, and the voltage of the bulb rises accordingly during use. Because the variation of the operating voltage of a stable current drive device of the circuit will lead to a continuous change of power in the working process of a lamp, the instability of the power will affect the light-emitting parameters and life of the bulb.

BRIEF SUMMARY OF THE INVENTION

The technical issue to be settled by the invention is to overcome the above-mentioned defects of the prior art to provide a constant-power supply apparatus and a solar simulation facility.

The technical solution adopted by the invention to settle the technical issue is as follows: a constant-power supply apparatus is provided and comprises: a power board and a control panel, wherein:

The power board comprises: a power input circuit for providing a power input, a power conversion circuit connected to the power input circuit, a voltage detection circuit, a current detection circuit and a power output circuit respectively connected to the power conversion circuit, and a first connector connected to the power conversion circuit, the voltage detection circuit and the current detection circuit;

The control panel comprises: a second connector pluggably connected to the first connector, a voltage processing circuit and a current processing circuit respectively connected to the second connector, a multiplier circuit connected to the voltage processing circuit and the current processing circuit, and a PWM (Pulse Width Modulation) circuit connected to the current processing circuit, the multiplier circuit and the second connector.

Preferably,

The power conversion circuit comprises a switch tube, a photocoupling unit and a Chock inductor, wherein an input terminal of the switch tube is connected to the power input circuit, an output terminal of the switch tube is connected to a first terminal of the Chock inductor, a second terminal of the Chock inductor is connected to the power output circuit, a control terminal of the switch tube is connected to a voltage output terminal of the photocoupling unit, a positive pole of the photocoupling unit is connected to a sixth pin of the first connector, and a negative pole of the photocoupling unit is connected to a first pin of the first connector.

Preferably,

The voltage detection circuit comprises a voltage dividing circuit, and the voltage processing circuit comprises a first amplifying circuit;

A first terminal of the voltage dividing circuit is connected to the power conversion circuit and the power output circuit, a second terminal of the voltage dividing circuit is grounded, and a third terminal of the voltage dividing circuit is connected to a tenth pin of the first connector;

An input terminal of the first amplifying circuit is connected to a tenth pin of the second connector, and an output terminal of the first amplifying circuit is connected to the multiplier circuit.

Preferably,

The first amplifying circuit comprises a first operational amplifier and a second operational amplifier;

A first input terminal of the first operational amplifier is connected to a first input terminal of the second operational amplifier and the first connector, a second input terminal of the first operational amplifier is connected to an output terminal of the first operational amplifier and the multiplier circuit, and a second input terminal of the second operational amplifier is connected to an output terminal of the second operational amplifier.

Preferably,

The current detection circuit comprises a Hall sensor arranged on the current conversion circuit, and the current processing circuit comprises a first rectifier tube and a second amplifying circuit;

An output terminal of the Hall sensor is connected to a third pin of the first connector, a first terminal of the first rectifier tube is connected to an input terminal of the second amplifying circuit, a second terminal of the first rectifier tube is connected to a third pin of the second connector, a third terminal of the first rectifier tube is grounded, and an output terminal of the second amplifying circuit is connected to the multiplier circuit.

Preferably,

The second amplifying circuit comprises a third operational amplifier and a first variable resistor;

A first input terminal of the third operational amplifier is connected to the first rectifier tube and a first terminal of the variable resistor, a second input terminal of the third operational amplifier is grounded, an output terminal of the third operational amplifier is connected to the multiplier circuit and a second terminal and a third terminal of the first variable resistor.

Preferably,

The multiplier circuit comprises an analog multiplier, a third amplifying circuit, a second rectifier tube and an output current regulation circuit;

A first input terminal of the analog multiplier is connected to the voltage processing circuit, a second input terminal of the analog multiplier is connected to the current processing circuit, an output terminal of the analog multiplier is connected to an input terminal of the third amplifying circuit, an output terminal of the third amplifying circuit is connected to a second terminal of the second rectifier tube, and a first terminal of the second rectifier tube is connected to the PWM circuit and the output current regulation circuit; and/or The PWM circuit comprises a modulation chip U4, wherein a second pin and a sixteenth pin of the modulation chip U4 are connected to the multiplier circuit, a twelfth pin and a thirteenth pin of the modulation chip U4 are connected to a first pin of the second connector, a tenth pin of the modulation chip U4 is connected to a ninth pin of the second connector, and a ninth pin and a first pin of the modulation chip U4 are connected to the current processing circuit.

Preferably,

The third amplifying circuit comprises a fourth operational amplifier, a fifth operational amplifier, a resistor R11, a resistor R14, a resistor R12, a diode D3, a capacitor C4 and a capacitor C5;

A second input terminal of the fourth operational amplifier is connected to an output terminal of the analog multiplier and a first terminal of the resistor R11, a second terminal of the resistor R11 is connected to an output terminal of the fourth operational amplifier and a first terminal of the resistor R14, a first input terminal of the fourth operational amplifier is grounded, a second terminal of the resistor R14 is connected to a first input terminal of the fifth operational amplifier, a positive pole of the diode D3, a first terminal of the capacitor C14 and a first terminal of the resistor R12, an output terminal of the fifth operational amplifier is connected to a negative pole of the diode D3, a second terminal of the capacitor C4 and a first terminal of the capacitor C5, a second terminal of the capacitor C5 is connected to a second terminal of the resistor R12, and a second input terminal of the fifth operational amplifier is grounded; and/or The output current regulation circuit comprises: a diode D1, a sixth operational amplifier, a second variable resistor, a resistor R4, a capacitor C14, a capacitor C2 and a resistor R8;

A positive pole of the diode D1 is connected to the first terminal of the second rectifier tube, a negative pole of the diode D1 is connected to an output terminal of the sixth operational amplifier through the resistor R4, a first input terminal of the sixth operational amplifier is grounded through the capacitor C14, a second input terminal of the sixth operational amplifier is connected to a first terminal of the capacitor C2, a first terminal of the resistor R8 and a third terminal of the second variable resistor, a second terminal of the capacitor C2 is grounded, a second terminal of the resistor R8 is connected to a fourth pin of the second connector, a second terminal of the second variable resistor is connected to a sixth pin of the second connector, and a first terminal of the second variable resistor is grounded.

Preferably,

The power output circuit comprises a bridge inversion output circuit and a third connector;

The bridge inversion output circuit comprises a MOS transistor Q4, a MOS transistor Q5, a MOS transistor Q6, a MOS transistor Q7, a diode D19, a diode D15, a diode D7 and a diode D8;

A gate of the MOS transistor Q4 is connected to a first pin of the third connector, and a source of the MOS transistor Q4 is connected to a positive pole of the diode D19 and a second pin of the third connector; a gate of the MOS transistor Q5 is connected to a third pin of the third connector, a drain of the MOS transistor Q5 is connected to a source of the MOS transistor Q4 and a negative pole of the diode D15, a gate of the MOS transistor Q6 is connected to a fourth pin of the third connector, a source of the MOS transistor Q6 is connected to a positive pole of the diode D7 and a fifth pin of the third connector, a gate of the MOS transistor Q7 is connected to a sixth pin of the third connector, a drain of the MOS transistor Q7 is connected to a source of the MOS transistor Q6 and a negative pole of the diode D8, a drain of the MOS transistor Q4, a negative pole of the diode D19, a drain of the MOS transistor Q6 and a negative pole of the diode D7 are respectively connected to a power conversion circuit, a positive pole of the diode D15 and a positive pole of the diode D8, and a source of the MOS transistor Q5 and a source of the MOS transistor Q7 are grounded.

The invention further provides a solar simulation facility, comprising any one constant-power supply apparatus mentioned above.

The constant-power supply apparatus and the solar simulation device have the following beneficial effects: a stable power output can be provided, and the reliability of circuit is guaranteed.

BRIEF DESCRIPTION OF THE SEVERAL VIEWS OF THE DRAWINGS

The invention will be further described below in conjunction with accompanying drawings and embodiments. In the figures.

DETAILED DESCRIPTION OF THE INVENTION

To gain a better understanding of the technical features, purposes and effects of the invention, specific embodiments of the invention will be explained in detail below with reference to the accompanying drawings.

Figure 1:
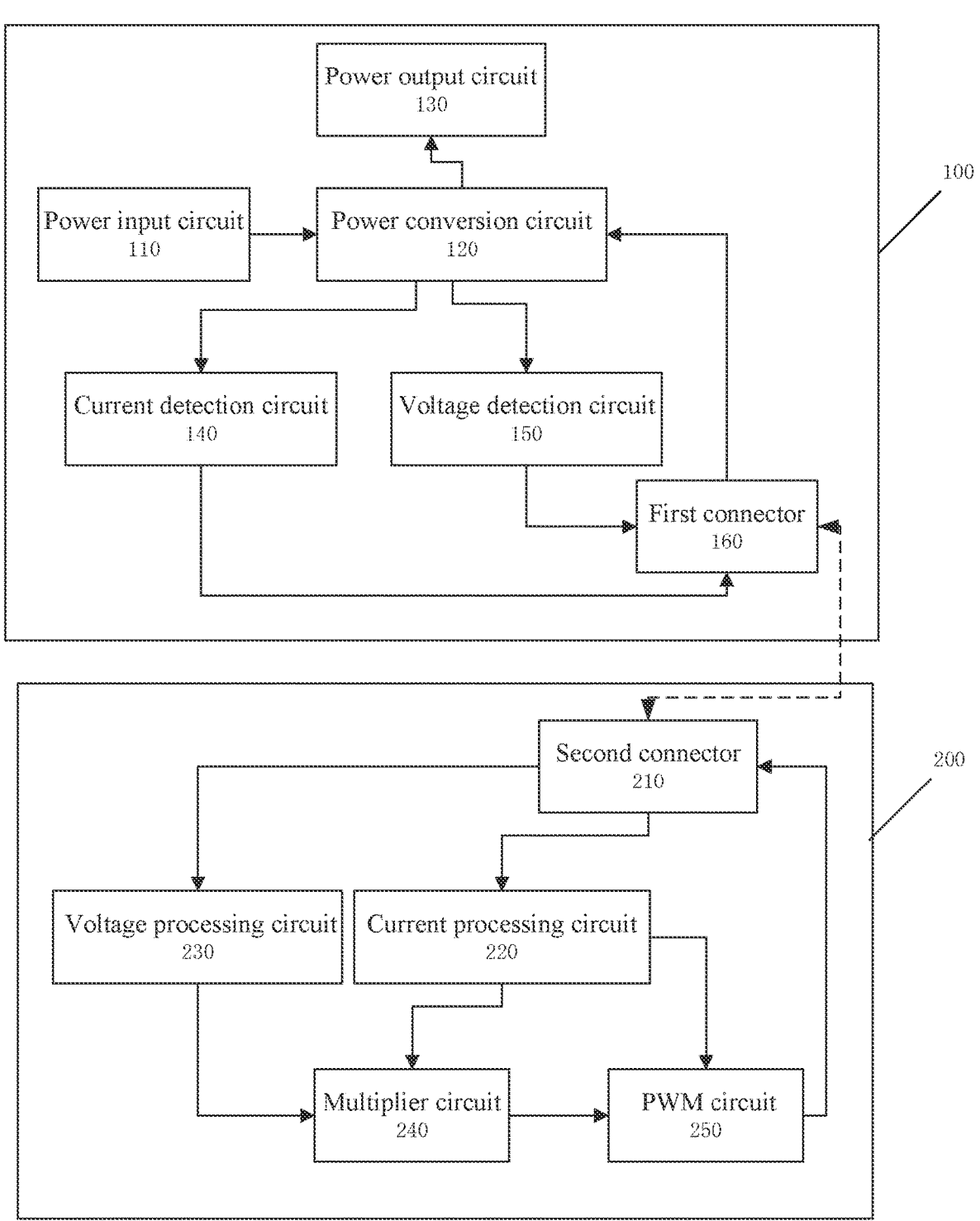
FIG. 1 is a structural diagram of a constant-power supply apparatus of the invention.

As shown in FIG. 1, in a first embodiment of the invention, a constant-power supply apparatus comprises a power board 100 and a control panel 200. The power board 100 comprises: a power input circuit 110 configured for providing a power input, a power conversion circuit 120 connected to the power input circuit 110, a voltage detection circuit 150, a current detection circuit 140 and a power output circuit 130 respectively connected to the power conversion circuit 120, and a first connector 160 connected to the power conversion circuit 120, the voltage detection circuit 150 and the current detection circuit 140. The control panel 200 comprises a second connector 210 pluggably connected to the first connector 160, a voltage processing circuit 230 and a current processing circuit 220 respectively connected to the second connector 210, a multiplier circuit 240 connected to the voltage processing circuit 230 and the current processing circuit 220, and a PWM circuit 250 connected to the current processing circuit 220, the multiplier circuit 240 and the second connector 210. Specifically, the constant-power supply apparatus comprises the power board 100 and the control panel 200, wherein the power board 100 and the control panel 200 are pluggably connected through the first connector 160 and the second connector 210. The power board 100 is configured for carrying out voltage conversion on the power input of the power input circuit 110 through the power conversion circuit 120 and then providing a power output through the power output circuit to provide operating power for a subsequent operating circuit. The power board 100 is provided with the voltage detection circuit 150 for detecting an output voltage of the power conversion circuit 120 and the current detection circuit 140 for detecting an output current of the power conversion circuit 120. A voltage detection signal corresponding to the output voltage and a current detection signal corresponding to the output current are input to the control panel 200 through the first connector 160 and the second connector 210, respectively. The control panel 200 is provided with the voltage processing circuit 230 corresponding to the voltage detection signal and the current processing circuit 220 corresponding to the current detection signal, the voltage detection signal and the current detection signal are processed by the voltage processing circuit 230 and the current processing circuit 220 and are then sent to the multiplier circuit 240 which acquires corresponding output power based on the voltage detection signal and the current detection signal and outputs a corresponding trigger signal based on the output power. The PWM circuit 250 acquires the trigger signal and the current detection signal processed by the current processing circuit 220 and is triggered by the trigger signal corresponding to the current detection signal to output a PWM signal, whereby the power conversion circuit 120 is controlled by the PWM signal to work and to output stable power.

Figure 2:
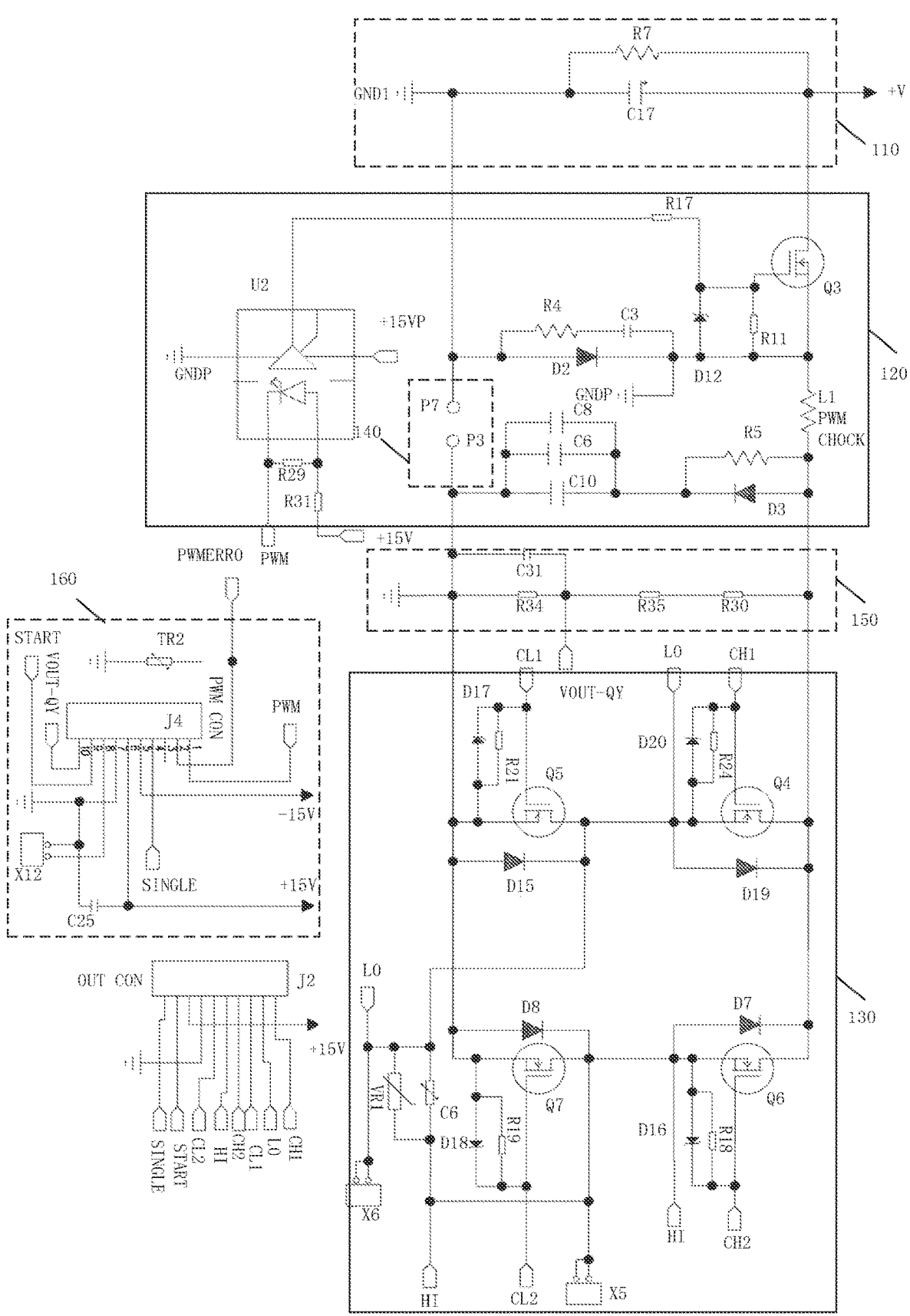
FIG. 2 is a schematic circuit diagram of one embodiment of a power board in the constant-power supply apparatus of the invention.

As shown in FIG. 2, the power conversion circuit 120 comprises a switch tube, a photocoupling unit and a Chock inductor, wherein an input terminal of the switch tube is connected to the power input circuit 110, an output terminal of the switch tube is connected to a first terminal of the Chock inductor, a second terminal of the Chock inductor is connected to the power output circuit, a control terminal of the switch tube is connected to a voltage output terminal of the photocoupling unit, a positive pole of the photocoupling unit is connected to a sixth pin of the first connector 160, and a negative pole of the photocoupling unit is connected to a first pin of the first connector 160. Specifically, in the power conversion circuit 120, the PWM signal output by the control panel 200 controls on or off of a positive pole and a negative pole of a light-emitting tube in the photocoupling unit to control on or off of a photosensitive tube in the photocoupling unit to finally control on or off of the switch tube, such that a final power output of the power conversion circuit 120 is controlled. Wherein, the photocoupling unit receives the PWM signal from the control panel 200 through the first pin of the first connector 160. Wherein, the switch tube comprises an MOS transistor Q3, the photocoupling unit comprises a photocoupler U2, the first connector 160 may be a 10PIN connector J4, a source of the MOS transistor Q3 is connected to the Chock inductor L1, and a gate of the MOS transistor Q3 is connected to a photosensitive output terminal of the photocoupler U2 through a resistor R17.

Figure 3:
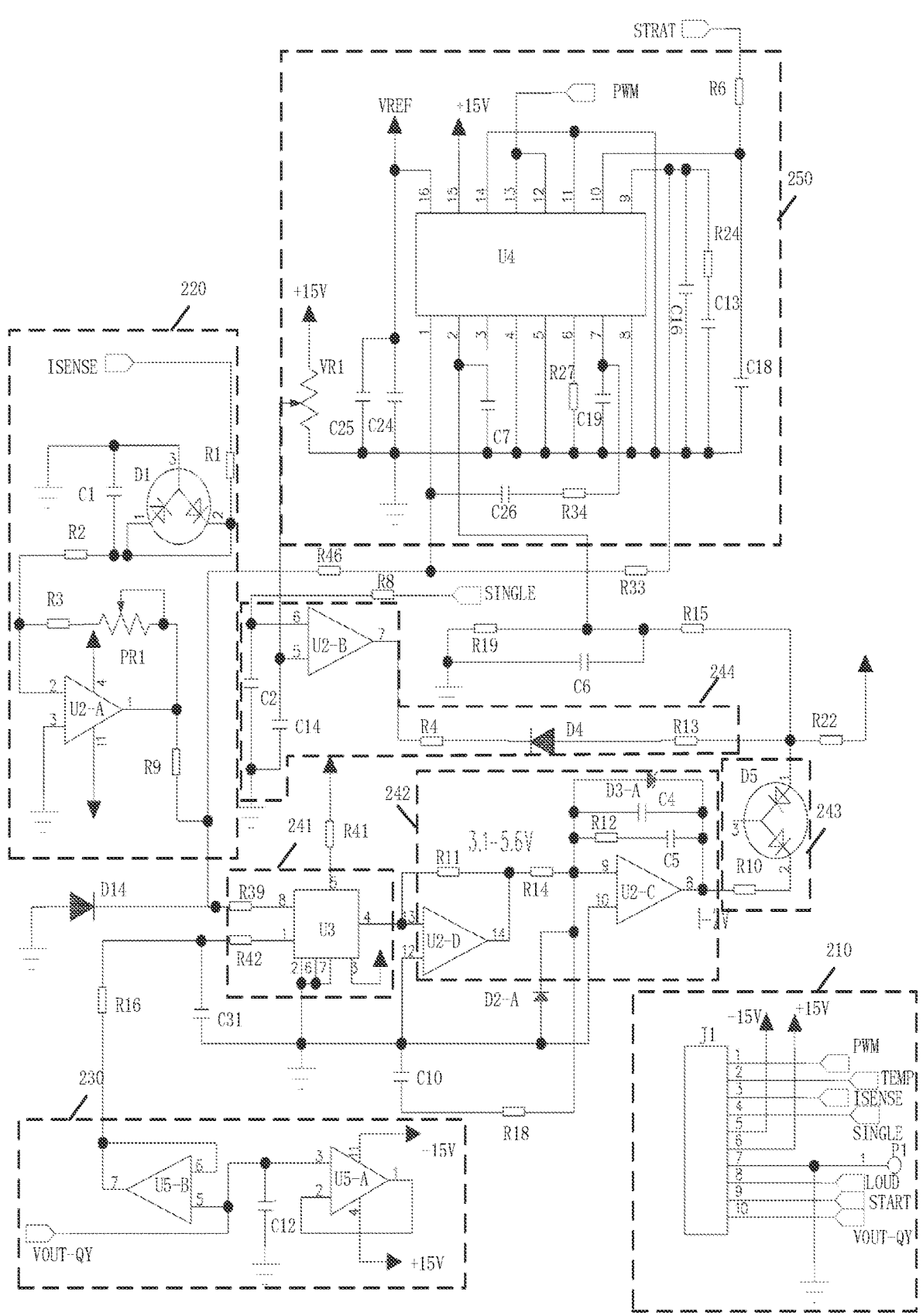
FIG. 3 is a schematic circuit diagram of one embodiment of a control panel in the constant-power supply apparatus of the invention.

Optionally, as shown in FIG. 2 and FIG. 3, the voltage detection circuit 150 comprises a voltage dividing circuit, and the voltage processing circuit 230 comprises a first amplifying circuit; a first terminal of the voltage dividing circuit is connected to the power conversion circuit 120 and the power output circuit 130, a second terminal of the voltage dividing circuit is grounded, and a third terminal of the voltage dividing circuit is connected to a tenth pin of the first connector 160; and an input terminal of the first amplifying circuit is connected to a tenth pin of the second connector 210, and an output terminal of the first amplifying circuit is connected to the multiplier circuit 240. Specifically, the voltage detection circuit 150 adopts the voltage dividing circuit for voltage detection, and the voltage dividing circuit may comprise a resistor R30, a resistor R35 and a resistor R34, wherein after being connected in series, the resistor R30 and the resistor R35 have one terminal connected to the power conversion circuit and the power output circuit 130 and the other terminal connected to a first terminal of the resistor R34 and the tenth pin of the first connector 160, the other terminal of the resistor R34 is grounded, and the voltage detection signal corresponding to the output voltage of the power conversion circuit is obtained through voltage division of the resistor R34. Wherein, the voltage detection signal is filtered by a capacitor C31 connected in parallel with the resistor R34. In the voltage processing circuit 230, the voltage detection signal is amplified by the first amplifying circuit, that is, the input terminal of the first amplifying circuit is connected to the tenth pin of the second connector 210, and the first amplifying circuit acquires the voltage detection signal through the tenth pin of the first connector 160. After being amplified, the voltage detection signal is sent to the multiplier circuit 240 for corresponding operation. The second connector 210 may be a 10PIN connector J1.

Optionally, the first amplifying circuit comprises a first operational amplifier U5-B and a second operational amplifier U5-A, wherein a first input terminal of the first operational amplifier U5-B is connected to a first input terminal of the second operational amplifier U5-A and the first connector 160, a second input terminal of the first operational amplifier U5-B is connected to an output terminal of the first operational amplifier U5-B and the multiplier circuit 240, and a second input terminal of the second operational amplifier U5-A is connected to an output terminal of the second operational amplifier U5-A. Specifically, the first amplifying circuit may be a follower amplifying circuit and adopts two operational amplifiers, namely the first operational amplifier U5-B and the second operational amplifier U5-A, the voltage detection signal is amplified by means of follower amplification realized by such a connection relation, and the amplified voltage detection signal is sent to the multiplier circuit 240 through the output terminal of the first operational amplifier U5-B.

Optionally, the current detection circuit 140 comprises a Hall sensor arranged on the power conversion circuit 120, and the current processing circuit 220 comprises a first rectifier tube D1 and a second amplifying circuit; an output terminal of the Hall sensor is connected to a third pin of the first connector 160, a first terminal of the first rectifier tube D1 is connected to an input terminal of the second amplifying circuit, a second terminal of the first rectifier tube D1 is connected to a third pin of the second connector 210, a third terminal of the first rectifier tube D1 is grounded, and an output terminal of the second amplifying circuit is connected to the multiplier circuit 240. Specifically, a wire for arranging the Hall sensor is reserved at a corresponding position of the power conversion circuit, and the Hall sensor is disposed around the wire and is mechanically connected to the wire. The Hall sensor detects an induction current generated when a current passes through the wire, that it, a corresponding current detection signal is generated; and the current detection signal is input to the control panel 200 through the third pin of the first connector 160. In the control panel 200, the current processing circuit 220 comprises the first rectifier tube D1 and the second amplifying circuit and rectifies the current detection signal through the second rectifier tube D1, and after being rectified, the current detection signal is amplified by the second amplifying circuit and is sent to the analog multiplier circuit 240 to be processed correspondingly.

Optionally, the second amplifying circuit comprises a third operational amplifier U2-A and a first variable resistor PR1, wherein a first input terminal of the third operational amplifier U2-A is connected to the first rectifier tube D1 and a first terminal of the first variable resistor PR1, a second input terminal of the third operational amplifier U2-A is grounded, and an output terminal of the third operational amplifier U2-A is connected to the multiplier circuit 240 and a second terminal and a third terminal of the first variable resistor PR1. Specifically, the second amplifying circuit amplifies the current detection signal through the third operational amplifier U2-A, wherein the first input terminal of the third operational amplifier U2-A is connected to the first terminal of the first variable resistor PR2 through a resistor R3, the output terminal of the third operational amplifier U2-A is connected to the second terminal and the third terminal of the first variable resistor PR1, and the amplification factor of the third operational amplifier U2-A can be changed by adjusting the first variable resistor PR1 to finally regulate the current output.

Optionally, the multiplier circuit 240 comprises an analog multiplier 241, a third amplifying circuit 242, a second rectifier tube 243 and an output current regulation circuit 244, wherein a first input terminal of the analog multiplier 241 is connected to the voltage processing circuit 230, a second input terminal of the analog multiplier 241 is connected to the current processing circuit 220, an output terminal of the analog multiplier 241 is connected to an input terminal of the third amplifying circuit 242, an output terminal of the third amplifying circuit 242 is connected to a second terminal of the second rectifier tube 243, and a first terminal of the second rectifier tube 243 is connected to the PWM circuit 250 and the output current regulation circuit 244. Specifically, the multiplier circuit 240 may comprise an analog multiplier 241 and may adopt an analog multiplier chip U3, wherein a first pin, corresponding to the first input terminal, of the analog multiplier chip U3 is connected to the voltage processing circuit 230 through a resistor R42, an eighth pin, corresponding to the second input terminal, of the analog multiplier chip U3 is connected to the current processing circuit 220 through a resistor R39, a fourth pin, corresponding to the output terminal, of the analog multiplier chip U3 is connected to the input terminal of the third amplifying circuit 242, the current detection signal and the voltage detection signal are multiplied by the analog multiplier chip U3 to obtain a power monitoring signal corresponding to the output power of the power conversion circuit 120, the power monitoring signal is amplifier by the third amplifying circuit 242 and is rectified by the second rectifier tube 243 to obtain a corresponding trigger signal, and the PWM circuit 250 is triggered by the trigger signal. Wherein, the second rectifier tube 243 may be a rectifier tube D5, the multiplier circuit 240 detects a current corresponding to the trigger signal output by the rectifier tube D5, and the current corresponding to the trigger signal is regulated by the output current regulation circuit, so that the PWM circuit 250 can recognize the trigger signal. A closed-loop system capable of realizing monitoring is formed by this circuit, the load power of a load circuit such as a light source varies along with the service time of the circuit when the load circuit works, and the power can be automatically stabilized by the regulation system by means of current detection. Wherein, the analog multiplier chip U3 may be a multiplier RC4200.

Optionally, the PWM circuit 250 comprises a modulation chip U4, wherein a second pin and a sixteenth pin of the modulation chip U4 are respectively connected to the multiplier circuit 240, a twelfth pin and a thirteenth pin of the modulation chip U4 are respectively connected to a first pin of the second connector 210, a tenth pin of the modulation chip U4 is connected to a ninth pin of the second connector 210, and a ninth pin and a first pin of the modulation chip U4 are respectively connected to the current processing circuit 220. The PWM circuit 250 may adopt the modulation chip U4, the modulation chip U4 may be a UC2524 chip, the second pin and the sixteenth pin of the modulation chip U4 are respectively connected to the multiplier circuit 240, wherein the second pin is used for receiving a trigger signal output by the multiplier circuit 240, the sixteenth pin is used for acquiring a reference voltage according to the trigger signal, the modulation chip U4 works according to the reference voltage, outputs a PWM signal through the twelfth pin and the thirteenth pin and outputs the PWM signal to the power board 100 through the first pin of the second connector 210, the tenth pin of the modulation chip U4 is connected to the ninth pin of the second connector 210 to receive a starting signal, and the starting signal is a ballast starting signal or a circuit work starting signal and is generally a high or low level. The ninth pin and the first pin of the modulation chip U4 are respectively connected to the current processing circuit 220 and are used for receiving a voltage signal, and the voltage is high when the current is large.

Optionally, the third amplifying circuit comprises a fourth operational amplifier U2-D, a fifth operational amplifier U2-C, a resistor R11, a resistor R14, a resistor R12, a diode D3, a capacitor C4 and a capacitor C5, wherein a second input terminal of the fourth operational amplifier U2-D is connected to an output terminal of the analog multiplier and a first terminal of the resistor R11, a second terminal of the resistor R11 is connected to an output terminal of the fourth operational amplifier U2-D and a first terminal of the resistor R14, a first input terminal of the fourth operational amplifier U2-D is grounded, a second terminal of the resistor R14 is connected to a first input terminal of the fifth operational amplifier U2-C, a positive pole of the diode D3, a first terminal of the capacitor C14 and a first terminal of the resistor R12, an output terminal of the fifth operational amplifier U2-C is connected to a negative pole of the diode D3, a second terminal of the capacitor C4 and a first terminal of the capacitor C5, a second terminal of the capacitor C5 is connected to a second terminal of the resistor R12, and a second input terminal of the fifth operational amplifier U2-C is grounded; an output signal of the analog multiplier is amplified by a third amplifying circuit composed of the fourth operational amplifier U2-D and the fifth operational amplifier U2-C to ensure that a trigger signal output by the multiplier circuit 240 meets requirements of the PWM circuit 250. The specific circuit connection relation has been described above. Wherein, the first input terminal of the fifth operational amplifier U2-C is grounded through a diode D2-A, a positive electrode of the diode D2-A is grounded, and a negative pole of the diode D2-A is connected to the first input terminal of the fifth operational amplifier U2-C.

Optionally, the output current regulation circuit comprises a diode D1, a sixth operational amplifier U2-B, a second variable resistor VR1, a resistor R4, a capacitor C14, a capacitor C12 and a resistor R8, wherein a positive pole of the diode D1 is connected to a first terminal of the second rectifier tube D5, a negative pole of the diode D1 is connected to an output terminal of the sixth operational amplifier U2-B through the resistor R4, a first input terminal of the sixth operational amplifier U2-B is grounded through the capacitor C14, a second input terminal of the sixth operational amplifier U2-B is connected to a first terminal of the capacitor C2, a first terminal of the resistor R8 and a third terminal of the second variable resistor VR1, a second terminal of the capacitor C2 is grounded, a second terminal of the resistor R8 is connected to a fourth pin of the second connector 210, a second terminal of the second variable resistor VR1 is connected to a sixth pin of the second connector 210, and a first terminal of the second variable resistor VR1 is grounded. The output current regulation circuit forms a differential amplifier through a DIMMER voltage and a voltage corresponding to the detection current.

Optionally, the power output circuit 130 comprises a bridge inversion output circuit and a third connector;

The bridge inversion output circuit comprises a MOS transistor Q4, a MOS transistor Q5, a MOS transistor Q6, a MOS transistor Q7, a diode D19, a diode D15, a diode D7 and a diode D8, wherein a gate of the MOS transistor Q4 is connected to a first pin of the third connector, and a source of the MOS transistor Q4 is connected to a positive pole of the diode D19 and a second pin of the third connector; a gate of the MOS transistor Q5 is connected to a third pin of the third connector, a drain of the MOS transistor Q5 is connected to a source of the MOS transistor Q4 and a negative pole of the diode D15, a gate of the MOS transistor Q6 is connected to a fourth pin of the third connector, a source of the MOS transistor Q6 is connected to a positive pole of the diode D7 and a fifth pin of the third connector, a gate of the MOS transistor Q7 is connected to a sixth pin of the third connector, a drain of the MOS transistor Q7 is connected to a source of the MOS transistor Q6 and a negative pole of the diode D8, a drain of the MOS transistor Q4, a negative pole of the diode D19, a drain of the MOS transistor Q6 and a negative pole of the diode D7 are respectively connected to a power conversion circuit, a positive pole of the diode D15 and a positive pole of the diode D8, and a source of the MOS transistor Q5 and a source of the MOS transistor Q7 are grounded. The bridge inversion output circuit provides a stable power output for a subsequent working circuit which may be a light-emitting unit.

In addition, the invention provides a solar simulation facility, comprising any one constant-power supply apparatus mentioned above. The constant-power supply apparatus provides a stable power output for a light-emitting unit in the solar simulation facility.

It can be understood that the above embodiments are merely preferred ones of the invention and are specifically described in detail, but these embodiments should not be construed as limitations of the scope of the patent of invention. It should be noted that all free combinations of the above technical features and different transformations and improvements made by those ordinarily skilled in the art without departing from the conception of the invention should also fall within the protection scope of the invention. Thus, all equivalent transformations and modifications made within the scope of the claims of the invention should also be under the coverage of the claims of the invention.

What is claimed is:

1. A constant-power supply apparatus, comprising: a power board and a control panel, wherein:

the power board comprises: a power input circuit configured for providing a power input, a power conversion circuit connected to the power input circuit, a voltage detection circuit, a current detection circuit and a power output circuit respectively connected to the power conversion circuit, and a first connector connected to the power conversion circuit, the voltage detection circuit and the current detection circuit; and the control panel comprises: a second connector pluggably connected to the first connector, a voltage processing circuit and a current processing circuit respectively connected to the second connector, a multiplier circuit connected to the voltage processing circuit and the current processing circuit, and a PWM circuit connected to the current processing circuit, the multiplier circuit and the second connector.

2. The constant-power supply apparatus according to claim 1, wherein:

the power conversion circuit comprises a switch tube, a photocoupling unit and a Chock inductor, an input terminal of the switch tube is connected to the power input circuit, an output terminal of the switch tube is connected to a first terminal of the Chock inductor, a second terminal of the Chock inductor is connected to the power output circuit, a control terminal of the switch tube is connected to a voltage output terminal of the photocoupling unit, a positive pole of the photocoupling unit is connected to a sixth pin of the first connector, and a negative pole of the photocoupling unit is connected to a first pin of the first connector.

3. The constant-power supply apparatus according to claim 1, wherein the voltage detection circuit comprises a voltage dividing circuit, and the voltage processing circuit comprises a first amplifying circuit;

a first terminal of the voltage dividing circuit is connected to the power conversion circuit and the power output circuit, a second terminal of the voltage dividing circuit is grounded, and a third terminal of the voltage dividing circuit is connected to a tenth pin of the first connector; and an input terminal of the first amplifying circuit is connected to a tenth pin of the second connector, and an output terminal of the first amplifying circuit is connected to the multiplier circuit.

4. The constant-power supply apparatus according to claim 3, wherein the first amplifying circuit comprises a first operational amplifier and a second operational amplifier;

a first input terminal of the first operational amplifier is connected to a first input terminal of the second operational amplifier and the first connector, a second input terminal of the first operational amplifier is connected to an output terminal of the first operational amplifier and the multiplier circuit, and a second input terminal of the second operational amplifier is connected to an output terminal of the second operational amplifier.

5. The constant-power supply apparatus according to claim 1, wherein the current detection circuit comprises a Hall sensor arranged in the power conversion circuit, and the current processing circuit comprises a first rectifier tube and a second amplifying circuit;

an output terminal of the Hall sensor is connected to a third pin of the first connector, a first terminal of the first rectifier tube is connected to an input terminal of the second amplifying circuit, a second terminal of the first rectifier tube is connected to a third pin of the second connector, a third terminal of the first rectifier tube is grounded, and an output terminal of the second amplifying circuit is connected to the multiplier circuit.

6. The constant-power supply apparatus according to claim 5, wherein the second amplifying circuit comprises a third operational amplifier and a first variable resistor;

a first input terminal of the third operational amplifier is connected to the first rectifier tube and a first terminal of the variable resistor, a second input terminal of the third operational amplifier is grounded, an output terminal of the third operational amplifier is connected to the multiplier circuit and a second terminal and a third terminal of the first variable resistor.

7. The constant-power supply apparatus according to claim 1, wherein the multiplier circuit comprises an analog multiplier, a third amplifying circuit, a second rectifier tube and an output current regulation circuit;

a first input terminal of the analog multiplier is connected to the voltage processing circuit, a second input terminal of the analog multiplier is connected to the current processing circuit, an output terminal of the analog multiplier is connected to an input terminal of the third amplifying circuit, an output terminal of the third amplifying circuit is connected to a second terminal of the second rectifier tube, and a first terminal of the second rectifier tube is connected to the PWM circuit and the output current regulation circuit.

8. The constant-power supply apparatus according to claim 7, wherein the third amplifying circuit comprises a fourth operational amplifier, a fifth operational amplifier, a resistor R11, a resistor R14, a resistor R12, a diode D3, a capacitor C4 and a capacitor C5;

a second input terminal of the fourth operational amplifier is connected to an output terminal of the analog multiplier and a first terminal of the resistor R11, a second terminal of the resistor R11 is connected to an output terminal of the fourth operational amplifier and a first terminal of the resistor R14, a first input terminal of the fourth operational amplifier is grounded, a second terminal of the resistor R14 is connected to a first input terminal of the fifth operational amplifier, a positive pole of the diode D3, a first terminal of the capacitor C14 and a first terminal of the resistor R12, an output terminal of the fifth operational amplifier is connected to a negative pole of the diode D3, a second terminal of the capacitor C4 and a first terminal of the capacitor C5, a second terminal of the capacitor C5 is connected to a second terminal of the resistor R12, and a second input terminal of the fifth operational amplifier is grounded.

9. The constant-power supply apparatus according to claim 7, wherein the output current regulation circuit comprises: a diode D1, a sixth operational amplifier, a second variable resistor, a resistor R4, a capacitor C14, a capacitor C2 and a resistor R8;

a positive pole of the diode D1 is connected to the first terminal of the second rectifier tube, a negative pole of the diode D1 is connected to an output terminal of the sixth operational amplifier through the resistor R4, a first input terminal of the sixth operational amplifier is grounded through the capacitor C14, a second input terminal of the sixth operational amplifier is connected to a first terminal of the capacitor C2, a first terminal of the resistor R8 and a third terminal of the second variable resistor, a second terminal of the capacitor C2 is grounded, a second terminal of the resistor R8 is connected to a fourth pin of the second connector, a second terminal of the second variable resistor is connected to a sixth pin of the second connector, and a first terminal of the second variable resistor is grounded.

10. The constant-power supply apparatus according to claim 1, wherein the power output circuit comprises a bridge inversion output circuit and a third connector;

the bridge inversion output circuit comprises a MOS transistor Q4, a MOS transistor Q5, a MOS transistor Q6, a MOS transistor Q7, a diode D19, a diode D15, a diode D7 and a diode D8;

a gate of the MOS transistor Q4 is connected to a first pin of the third connector, and a source of the MOS transistor Q4 is connected to a positive pole of the diode D19 and a second pin of the third connector;

a gate of the MOS transistor Q5 is connected to a third pin of the third connector, a drain of the MOS transistor Q5 is connected to a source of the MOS transistor Q4 and a negative pole of the diode D15;

a gate of the MOS transistor Q6 is connected to a fourth pin of the third connector, a source of the MOS transistor Q6 is connected to a positive pole of the diode D7 and a fifth pin of the third connector;

a gate of the MOS transistor Q7 is connected to a sixth pin of the third connector, a drain of the MOS transistor Q7 is connected to a source of the MOS transistor Q6 and a negative pole of the diode D8;

a drain of the MOS transistor Q4, a negative pole of the diode D19, a drain of the MOS transistor Q6 and a negative pole of the diode D7 are respectively connected to a power conversion circuit; and a positive pole of the diode D15 and a positive pole of the diode D8, and a source of the MOS transistor Q5 and a source of the MOS transistor Q7 are grounded.

11. The constant-power supply apparatus according to claim 1, wherein, the PWM circuit comprises a modulation chip U4, a second pin and a sixteenth pin of the modulation chip U4 are respectively connected to the multiplier circuit, a twelfth pin and a thirteenth pin of the modulation chip U4 are respectively connected to a first pin of the second connector, a tenth pin of the modulation chip U4 is connected to a ninth pin of the second connector, and a ninth pin and a first pin of the modulation chip U4 are respectively connected to the current processing circuit.

12. A solar simulation facility, comprising the constant-power supply apparatus including a power board and a control panel, wherein:

the power board comprises: a power input circuit configured for providing a power input, a power conversion circuit connected to the power input circuit, a voltage detection circuit, a current detection circuit and a power output circuit respectively connected to the power conversion circuit, and a first connector connected to the power conversion circuit, the voltage detection circuit and the current detection circuit; and the control panel comprises: a second connector pluggably connected to the first connector, a voltage processing circuit and a current processing circuit respectively connected to the second connector, a multiplier circuit connected to the voltage processing circuit and the current processing circuit, and a PWM circuit connected to the current processing circuit, the multiplier circuit and the second connector.

13. The solar simulation facility according to claim 12, wherein the power conversion circuit comprises a switch tube, a photocoupling unit and a Chock inductor, an input terminal of the switch tube is connected to the power input circuit, an output terminal of the switch tube is connected to a first terminal of the Chock inductor, a second terminal of the Chock inductor is connected to the power output circuit, a control terminal of the switch tube is connected to a voltage output terminal of the photocoupling unit, a positive pole of the photocoupling unit is connected to a sixth pin of the first connector, and a negative pole of the photocoupling unit is connected to a first pin of the first connector.

14. The solar simulation facility according to claim 12, wherein the voltage detection circuit comprises a voltage dividing circuit, and the voltage processing circuit comprises a first amplifying circuit;

a first terminal of the voltage dividing circuit is connected to the power conversion circuit and the power output circuit, a second terminal of the voltage dividing circuit is grounded, and a third terminal of the voltage dividing circuit is connected to a tenth pin of the first connector; and an input terminal of the first amplifying circuit is connected to a tenth pin of the second connector, and an output terminal of the first amplifying circuit is connected to the multiplier circuit.

15. The solar simulation facility according to claim 12, wherein the current detection circuit comprises a Hall sensor arranged in the power conversion circuit, and the current processing circuit comprises a first rectifier tube and a second amplifying circuit;

an output terminal of the Hall sensor is connected to a third pin of the first connector, a first terminal of the first rectifier tube is connected to an input terminal of the second amplifying circuit, a second terminal of the first rectifier tube is connected to a third pin of the second connector, a third terminal of the first rectifier tube is grounded, and an output terminal of the second amplifying circuit is connected to the multiplier circuit.

16. The solar simulation facility according to claim 12, wherein the multiplier circuit comprises an analog multiplier, a third amplifying circuit, a second rectifier tube and an output current regulation circuit;

a first input terminal of the analog multiplier is connected to the voltage processing circuit, a second input terminal of the analog multiplier is connected to the current processing circuit, an output terminal of the analog multiplier is connected to an input terminal of the third amplifying circuit, an output terminal of the third amplifying circuit is connected to a second terminal of the second rectifier tube, and a first terminal of the second rectifier tube is connected to the PWM circuit and the output current regulation circuit.

17. The solar simulation facility according to claim 16, wherein the third amplifying circuit comprises a fourth operational amplifier, a fifth operational amplifier, a resistor R11, a resistor R14, a resistor R12, a diode D3, a capacitor C4 and a capacitor C5;

a second input terminal of the fourth operational amplifier is connected to an output terminal of the analog multiplier and a first terminal of the resistor R11, a second terminal of the resistor R11 is connected to an output terminal of the fourth operational amplifier and a first terminal of the resistor R14, a first input terminal of the fourth operational amplifier is grounded, a second terminal of the resistor R14 is connected to a first input terminal of the fifth operational amplifier, a positive pole of the diode D3, a first terminal of the capacitor C14 and a first terminal of the resistor R12, an output terminal of the fifth operational amplifier is connected to a negative pole of the diode D3, a second terminal of the capacitor C4 and a first terminal of the capacitor C5, a second terminal of the capacitor C5 is connected to a second terminal of the resistor R12, and a second input terminal of the fifth operational amplifier is grounded.

18. The solar simulation facility according to claim 16, wherein the output current regulation circuit comprises: a diode D1, a sixth operational amplifier, a second variable resistor, a resistor R4, a capacitor C14, a capacitor C2 and a resistor R8;

a positive pole of the diode D1 is connected to the first terminal of the second rectifier tube, a negative pole of the diode D1 is connected to an output terminal of the sixth operational amplifier through the resistor R4, a first input terminal of the sixth operational amplifier is grounded through the capacitor C14, a second input terminal of the sixth operational amplifier is connected to a first terminal of the capacitor C2, a first terminal of the resistor R8 and a third terminal of the second variable resistor, a second terminal of the capacitor C2 is grounded, a second terminal of the resistor R8 is connected to a fourth pin of the second connector, a second terminal of the second variable resistor is connected to a sixth pin of the second connector, and a first terminal of the second variable resistor is grounded.

19. The solar simulation facility according to claim 12, wherein the PWM circuit comprises a modulation chip U4, a second pin and a sixteenth pin of the modulation chip U4 are respectively connected to the multiplier circuit, a twelfth pin and a thirteenth pin of the modulation chip U4 are respectively connected to a first pin of the second connector, a tenth pin of the modulation chip U4 is connected to a ninth pin of the second connector, and a ninth pin and a first pin of the modulation chip U4 are respectively connected to the current processing circuit.

20. The solar simulation facility according to claim 12, wherein the power output circuit comprises a bridge inversion output circuit and a third connector;

the bridge inversion output circuit comprises a MOS transistor Q4, a MOS transistor Q5, a MOS transistor Q6, a MOS transistor Q7, a diode D19, a diode D15, a diode D7 and a diode D8;

a gate of the MOS transistor Q4 is connected to a first pin of the third connector, and a source of the MOS transistor Q4 is connected to a positive pole of the diode D19 and a second pin of the third connector;

a gate of the MOS transistor Q5 is connected to a third pin of the third connector, a drain of the MOS transistor Q5 is connected to a source of the MOS transistor Q4 and a negative pole of the diode D15;

a gate of the MOS transistor Q6 is connected to a fourth pin of the third connector, a source of the MOS transistor Q6 is connected to a positive pole of the diode D7 and a fifth pin of the third connector;

a gate of the MOS transistor Q7 is connected to a sixth pin of the third connector, a drain of the MOS transistor Q7 is connected to a source of the MOS transistor Q6 and a negative pole of the diode D8;

a drain of the MOS transistor Q4, a negative pole of the diode D19, a drain of the MOS transistor Q6 and a negative pole of the diode D7 are respectively connected to a power conversion circuit; and a positive pole of the diode D15 and a positive pole of the diode D8, and a source of the MOS transistor Q5 and a source of the MOS transistor Q7 are grounded.

* * * * *